(12) United States Patent
Steinberg et al.

(10) Patent No.: US 8,439,641 B2
(45) Date of Patent: May 14, 2013

(54) FLOW DRIVEN ENGINE

(76) Inventors: Avigdor Steinberg, Sunnyvale, CA (US); Yury Pleshov, Moscow (RU); Bao Tran, Saratoga, CA (US)

(*) Notice: Subject to any disclaimer, the term of this patent is extended or adjusted under 35 U.S.C. 154(b) by 0 days.

(21) Appl. No.: 13/341,980

(22) Filed: Dec. 31, 2011

(65) Prior Publication Data
US 2012/0121414 A1   May 17, 2012

(51) Int. Cl.
*F03D 3/06* (2006.01)

(52) U.S. Cl.
USPC .......................................................... 416/117

(58) Field of Classification Search .................. 416/117, 416/119, 41; 415/4.1, 4.2, 4.4, 905, 917
See application file for complete search history.

(56) References Cited

U.S. PATENT DOCUMENTS

| | | | |
|---|---|---|---|
| 546,195 A * | 9/1895 | Park .............................. 359/882 |
| 925,063 A * | 6/1909 | White ........................... 416/117 |
| 1,036,109 A * | 8/1912 | Haslinger et al. .............. 416/119 |
| 3,920,354 A * | 11/1975 | Decker ......................... 416/119 |
| 4,184,084 A | 1/1980 | Grehore |
| 4,303,835 A | 12/1981 | Bair |
| 5,057,696 A | 10/1991 | Thomas |
| 5,332,925 A | 7/1994 | Thomas |
| 5,553,996 A | 9/1996 | Farrar |

* cited by examiner

*Primary Examiner* — Richard Edgar
(74) *Attorney, Agent, or Firm* — Tran & Associates

(57) ABSTRACT

A system for converting between fluid movement, such as wind, and mechanical rotation is disclosed. The system includes a support which is rotatable about a first axis orthogonal to the direction of fluid movement and at least one panel mounted on the support for rotation about a said axis. The panel includes a matrix of flaps (elementary panels) mounted on the panel framework for rotation about a multiple secondary axes; and retaining hardware serving to resist rotation of the said flaps during a first portion of the rotation cycle of the support and permitting the flaps to rotate freely during a second portion of said cycle. The panel provides a driving torque during said first portion of the cycle and moving freely to an orientation of minimum fluid resistance during said second portion.

18 Claims, 7 Drawing Sheets

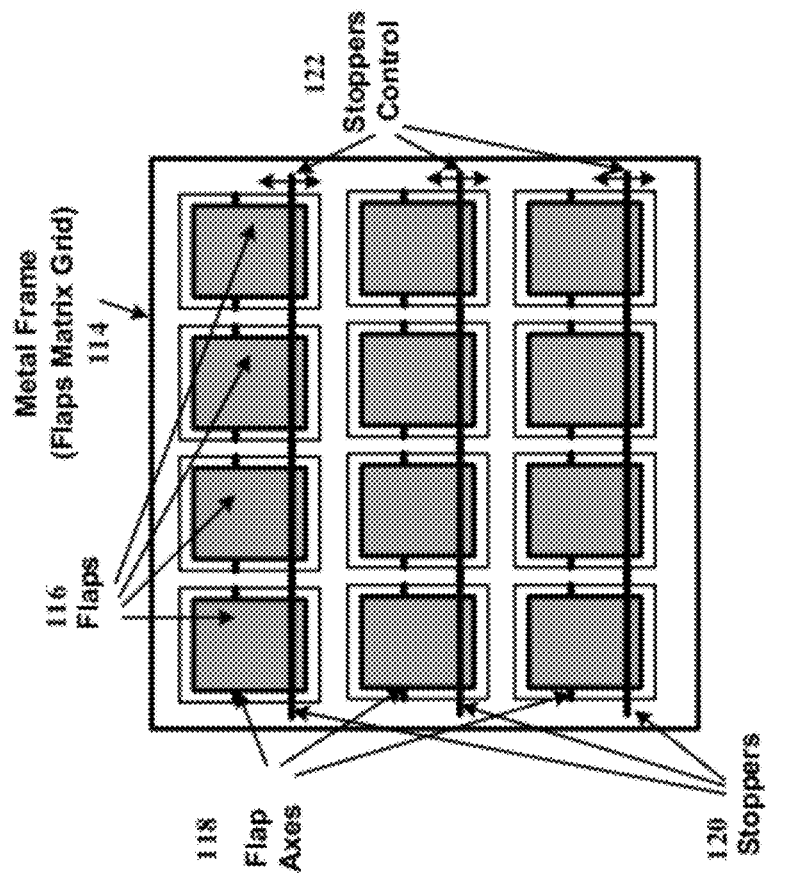
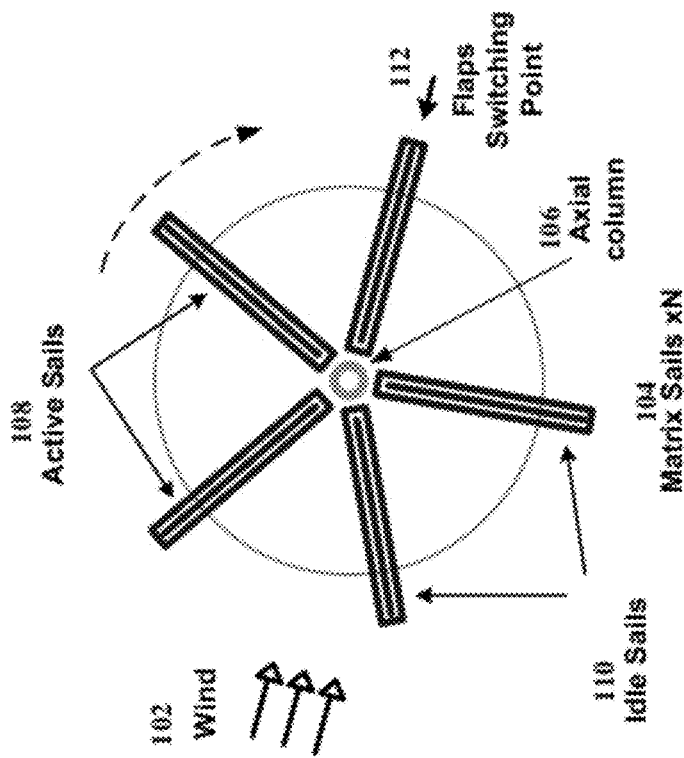

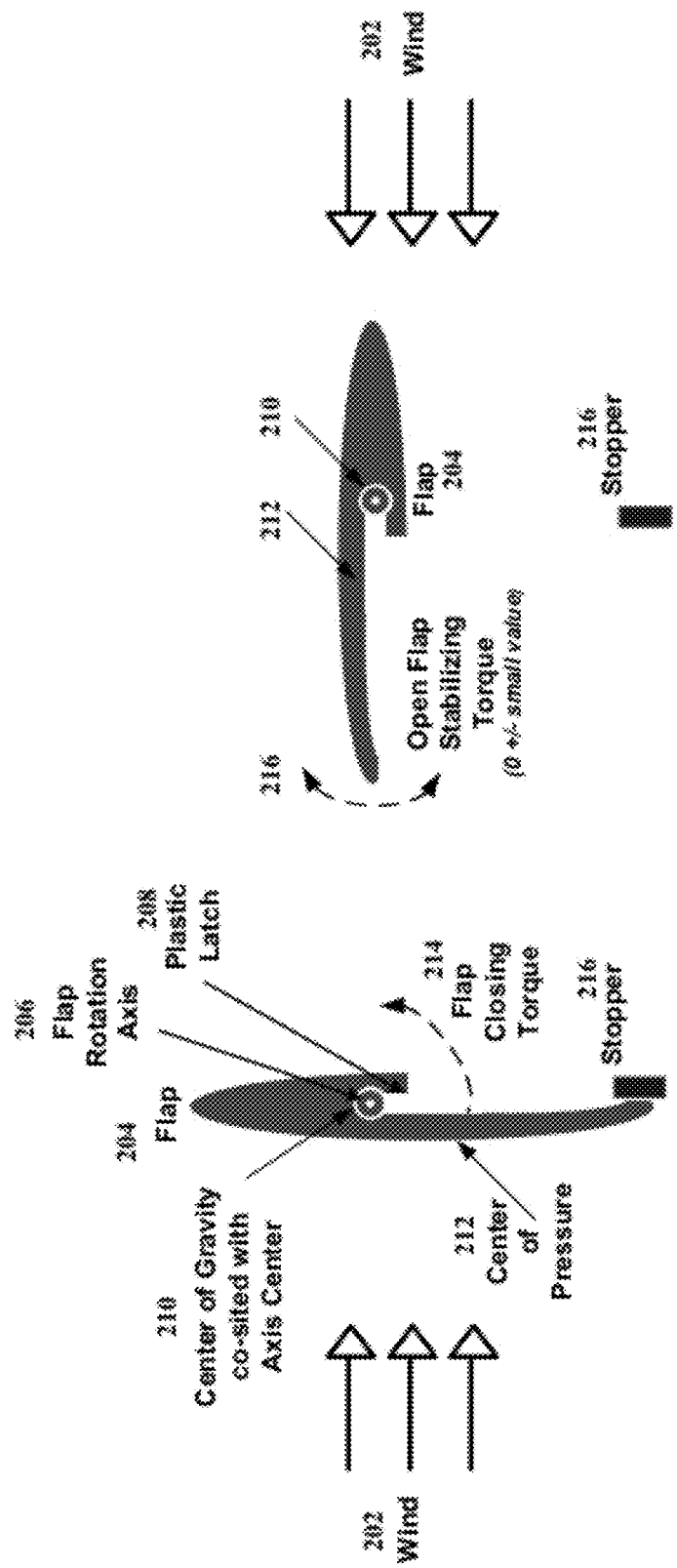

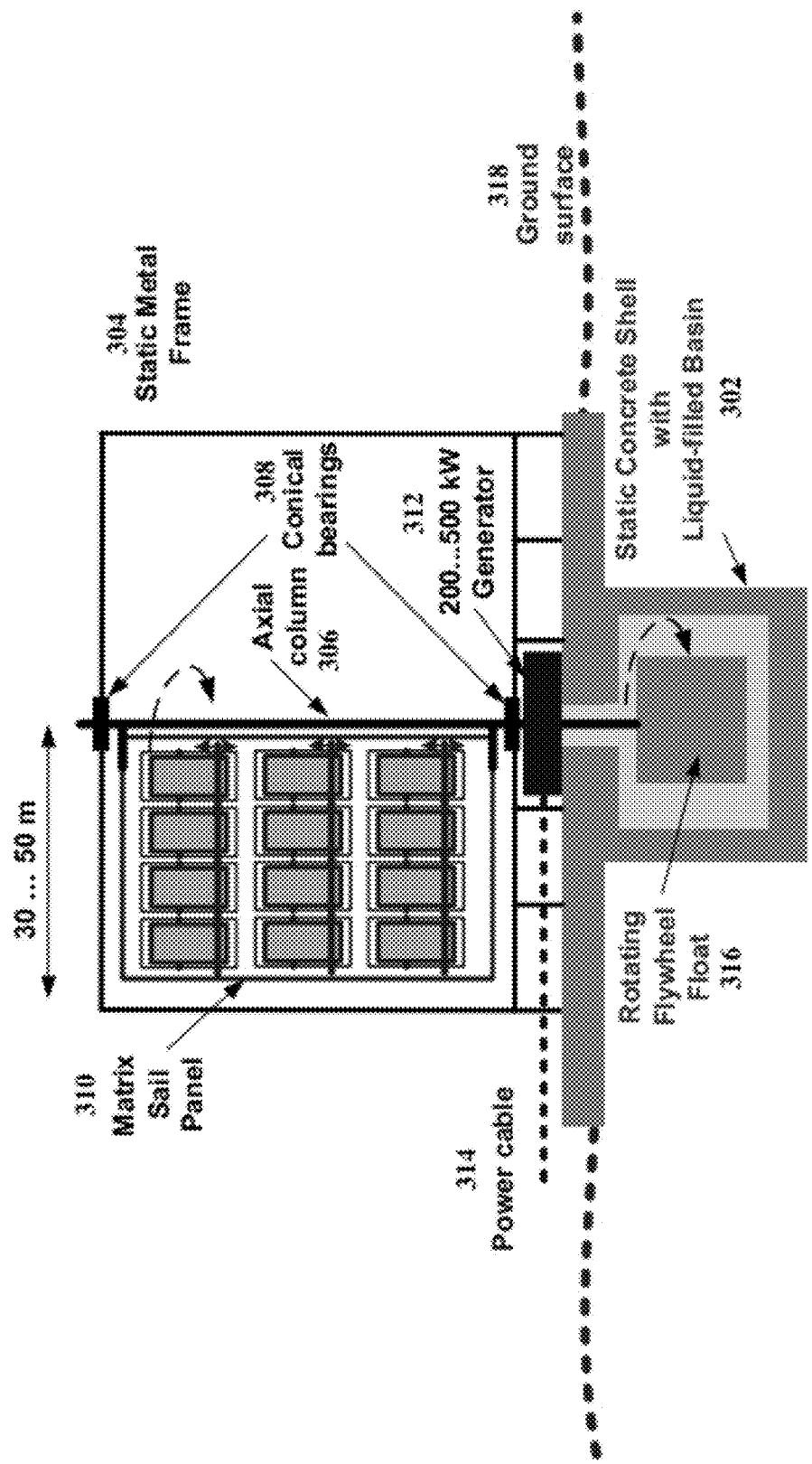

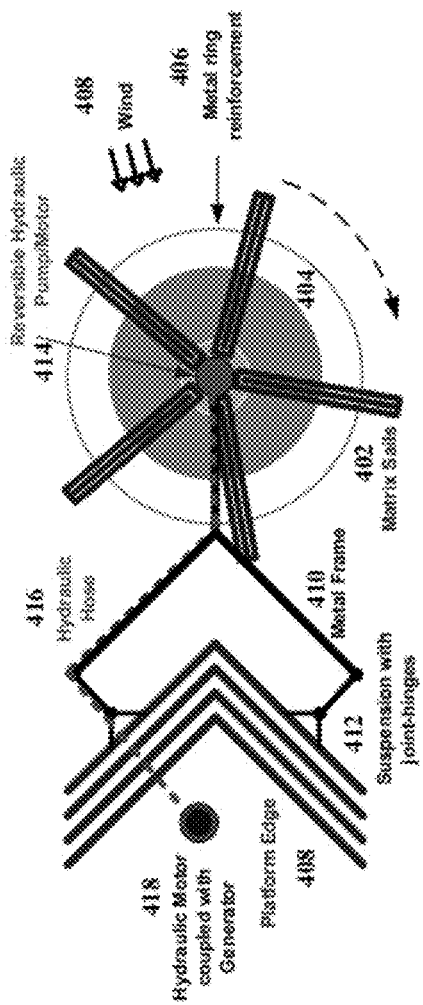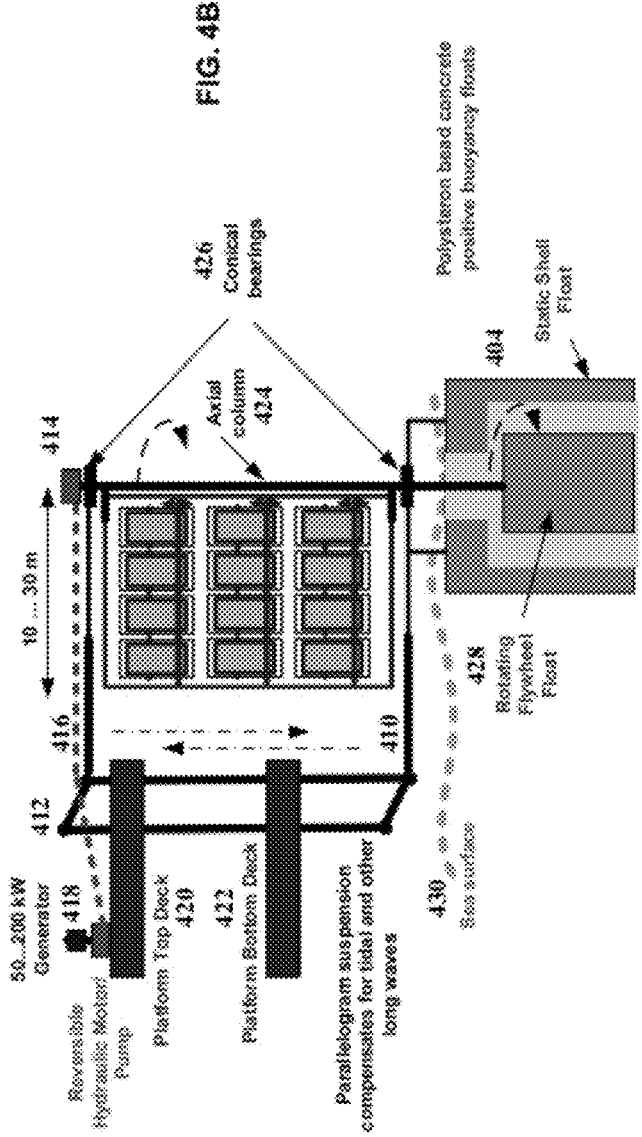

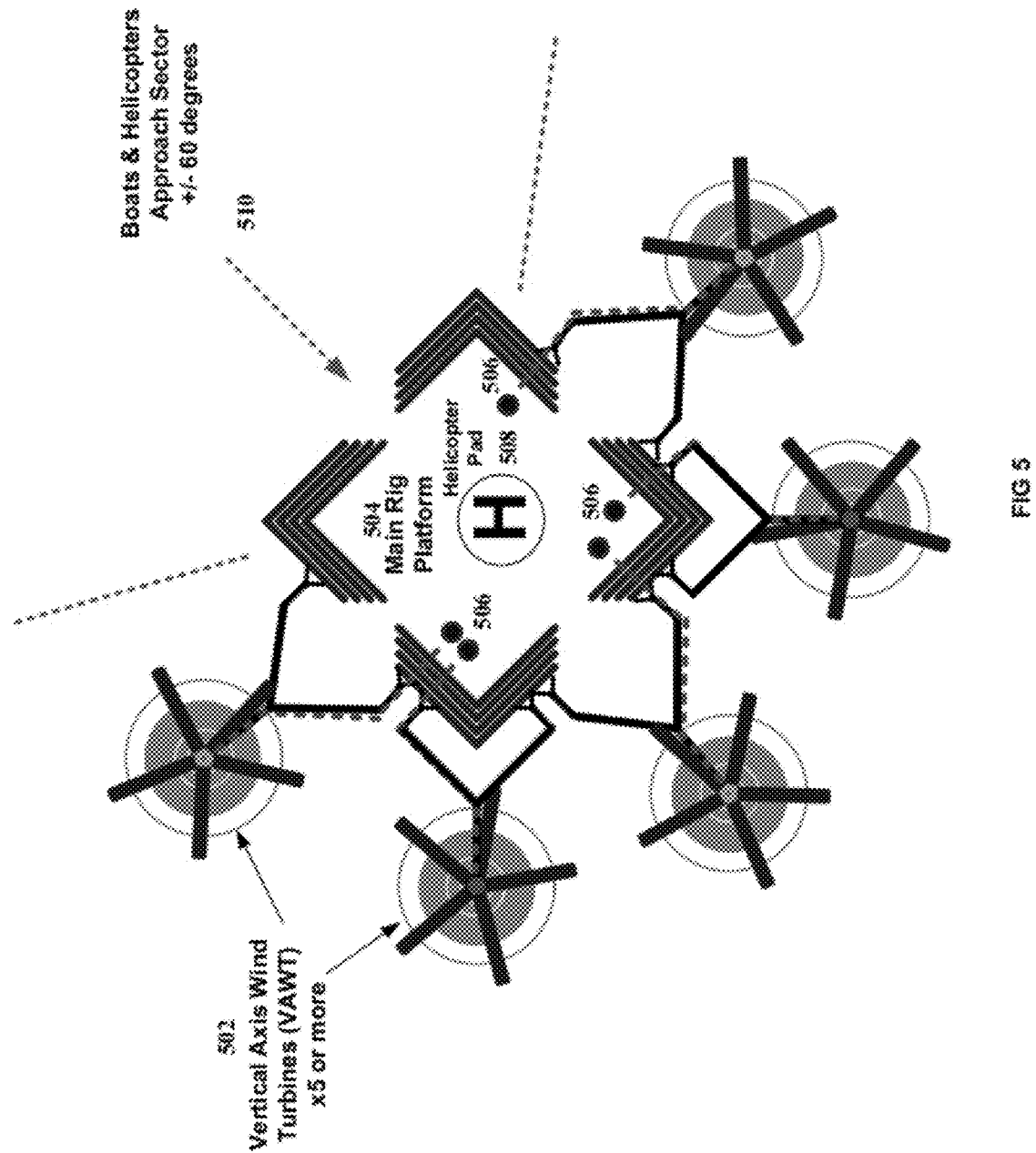

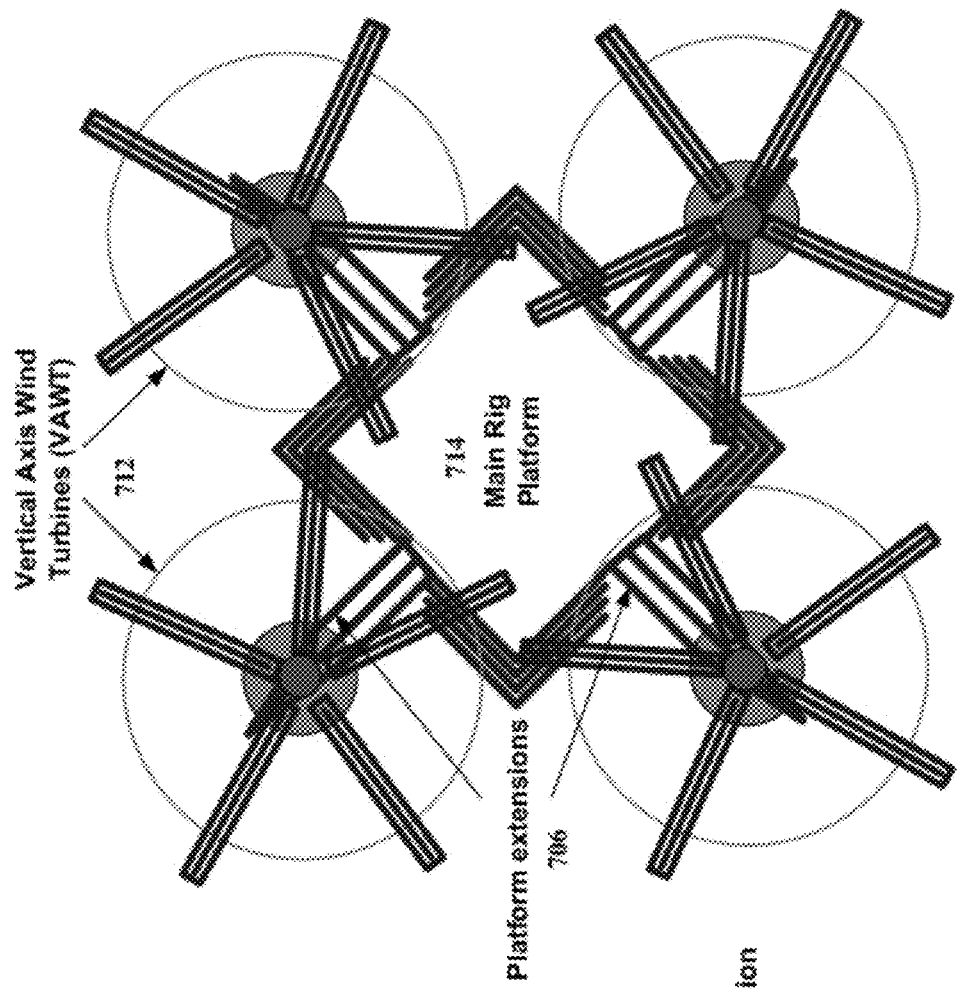
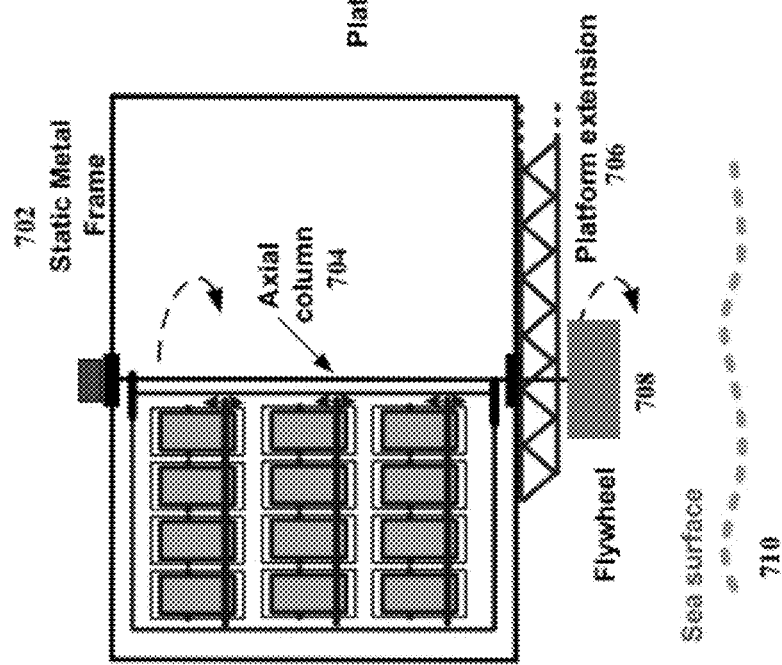
FIG. 7A
FIG. 7B

FLOW DRIVEN ENGINE

BACKGROUND

This invention relates to the transformation of the fluid movement (flow) energy and, in the most important example, to the usage of wind energy to provide the renewable source of mechanical or electrical power.

Wind turbines convert wind energy into electricity. The two main types of wind turbines include the horizontal-axis wind turbines and the vertical-axis wind turbines. The current models of practically used wind-driven engines fall in two main categories: propeller systems with horizontal axis of rotation also known as horizontal axis wind turbines (HAWT) and vertical axis wind turbines (VAWT). The later have the advantage of more economic use of ground (or water) area, lower cost and easier maintenance. One advantage of VAWT systems is that the turbine doesn't need to be pointed into the wind. Another advantage of the VAWT arrangement is that the generator and/or gearbox can be placed at the bottom, near the ground, so the tower doesn't need to support it.

The two main types of vertical axis wind turbines include one type having rotating blades without lift generating surfaces and include the Darreius-Type having rotating blades with lift generating airfoils (VAWT). The HAWT typically has a rotor and blades with lifting surfaces mounted on a horizontal-axis and directed upwind atop a tower. Wind energy incident to the blades rotates the rotor, and a gearbox and other components are connected to the rotor communicate the rotation to an electric generator that converts the rotation to electrical energy. To be effective, the blades must be directed relative to the direction of the wind. Therefore, the HAWT typically has a yaw mechanism to allow the blades to rotate around the tower. Because the blades are upwind of the tower, they must be made of rigid, strong material so they cannot be bent back by the wind and hit the tower. Requiring more rigid materials, the blades are more expensive to manufacture and are heavy. In addition, the tower's yaw mechanism must be strong so it can determine the direction of the wind direction and orient the blades into the direction of the wind. Finally, the tower must also be strong so it can support the heavy rotor, gear-box, generator, and other equipment on top of the tower. Therefore, the tower requires more materials, is more expensive to build, and is heavy. Overall, the HAWT is a 'rigid' wind turbine, requires more materials, is heavy, and has a high center of gravity. In addition, it needs to be oriented to face the wind, and requires a firm foundation or platform. Therefore, it is very expensive to build a floating platform to support the HAWT, which is heavy, has a high center of gravity, and requires a very stable platform.

By contrast, the conventional VAWT uses a rotor that runs vertically from the ground and has curved blades connected at the rotor's ends. This vertical rotor sits on a bearing and gearbox component and drives an electric generator. Unlike the HAWT, the VAWT is omni-directional and does not need to be oriented into the wind. In addition, the VAWT has a low center of gravity with its heavy components such a gearbox, generator, braking and control system positioned near the ground. Therefore, the VAWT does not require an as rigid rotor as with the HAWT's tower to support these components. Example of VAWTs in the prior art can be found in the website of www.ecopowerusa.com. The HAWTs have been widely used in land-based windfarms around the world. HAWTs have also been used in offshore windfarms in Europe. A conventional offshore HAWT 30 has the conventional components of a rotor and blades supported horizontally on a vertical tower. These conventional components rest on a fixed support rigidly affixed to the sea floor. Examples of the offshore HAWT can be found in U.S. Patent Application Publication 2007/0040388, published February 2007, and PCT Published Application WO/03/004870, published Jan. 16, 2003. Another type of conventional offshore HAWT also has the conventional components of rotor, blades, and tower, but these components rest on a floating support that is rigidly affixed to the sea floor by cables. An example of this type of conventional HAWT can be found in PCT Application Publication 2005/021961, published Mar. 10, 2005.

United States Patent Application 2009/0072544 discloses an offshore wind turbine with a vertical-axis wind turbine (VAWT) mounted on a platform. The VAWT has a vertical rotor and curved blades coupled to a gearbox and an electric generator. The VAWT can fixedly extend from the platform or may be capable of reclining on the platform either manually or automatically. The platform can be composed of modular elements coupled together. Offshore, the platform can be semi-submersible with the VAWT extending out of the water and with a counterbalance extending below the platform. Alternatively, the platform can float on the water's surface and can have several arms that extend outwardly from the VAWT to increase the platform's footprint. To anchor the turbine offshore, anchoring systems can anchor the platform to the seabed while allowing the floating wind turbine to adjust passively or actively to changes in sea level due to tidal variations or storm swells.

As these prior art publications disclose many well-known implementation details concerning the design and operation of wind turbines generally, they are all incorporated herein by reference in their entireties.

SUMMARY

In one aspect, a system for converting between fluid movement, such as wind, and mechanical rotation is disclosed. The system includes a support which is rotatable about a first axis orthogonal to the direction of fluid movement and at least one panel mounted on the support for rotation about a said axis. The panel includes a matrix of flaps (elementary panels) mounted on the panel framework for rotation about a multiple secondary axes; and retaining hardware serving to resist rotation of the said flaps during a first portion of the rotation cycle of the support and permitting the flaps to rotate freely during a second portion of said cycle. The panel provides a driving torque during said first portion of the cycle and moving freely to an orientation of minimum fluid resistance during said second portion.

Implementations of the above system can include one or more of the following. There are provided a plurality of said panels which provide driving torque during different respective portions of the cycle of rotation of the support. The panels are distributed circumferentially about said first axis. Flow resistance distribution of each rotating flap is eccentric with respect to its axis of rotation. The mass distribution and/or shape of each rotating flap ensure that the center of mass of the rotating flap lays close to its axis of rotation. The retaining hardware can include an abutment on the support for each rotating flap. The abutment is retractable to place the rotating flaps in a non-driving mode. The abutments are retractable by groups depending on the measured speed of the flow. The rotating flaps are substantially planar. The rotating flaps are aerodynamically shaped.

In another aspect, a flow driven apparatus includes a support which is rotatable about a vertical axis; at least one sail panel mounted on the support for rotation about the said axis; each sail panel contains at least one flap and retaining means serving to resist rotation of the flap around the horizontal or vertical axis belonging to the sail panel during a first portion of the rotation cycle of the support and permitting the flap to rotate freely during a second portion of said cycle, the sail panel thereby providing a driving torque during said first portion of the cycle and moving freely with minimum fluid resistance during said second portion, the sail resistance alteration being caused by change of elementary flaps orientation.

In yet another aspect, an apparatus for converting between fluid movement, such as wind, and mechanical rotation is disclosed. The apparatus has a support which is rotatable about a first axis orthogonal to the direction of fluid movement and at least one panel mounted on the support for rotation about a said axis. The panel contains a matrix of flap elements and retaining means serving to resist rotation of the flaps during a first portion of the rotation cycle of the support and permitting the flaps to rotate freely during a second portion of said cycle. The panel provides a driving torque during said first portion of the cycle and moving freely to an orientation of minimum fluid resistance during said second portion.

In another aspect, a method to convert fluid movement, such as wind, and mechanical rotation, into energy and vice versa is disclosed. The method includes rotating a panel with a matrix of flaps (elementary panels) mounted on the panel framework about a multiple secondary axes; resisting rotation of the flaps during a first portion of the rotation cycle of the support and permitting the flaps to rotate freely during a second portion of said cycle, where the flaps provide driving torque during said first portion of the cycle and moves freely to an orientation of minimum fluid resistance during said second portion.

Advantages of the various embodiments may include one or more of the following. The system offers significant cost and performance improvements in the transformation of the fluid movement energy, such as wind. Compared with the prior-art technology the efficiency of the usage of flow energy is significantly higher. This is because of the increase of the positive component of the rotating force and the reduction of the negative component mentioned above. The system can be installed either onshore or offshore, e.g. on the artificial platforms in the open sea, such as abandoned oil-rigs, where system height is limited, but weight and width restrictions are less important. The use of sea water in the offshore installations for two significant improvements:
  a) It provides floating support and floating flywheel, reducing downward pressure and rotation non-uniformity, thus reducing load on bearings and other mechanical elements,
  b) It allows system installation near the main platform (as opposite to the installation on the platform itself), thus allowing sail panel sizes comparable in size or even larger than the size of the main platform.

The system minimizes the pulsating torque that can be produced during each revolution in conventional wind engines. The system can be easily mounted as vertical-axis turbines on towers, and as a result the system can operate in the faster, less turbulent air flow high above the ground, with resulting high energy extraction efficiency. This is more important for inland installations because water has less surface roughness than land (especially deeper water), the average wind speed is usually considerably higher over open water. The system works well even in the condition where one part of the air flow is hitting one side of turbine forces it to rotate, but at the same time the other part (neighboring part of the air flow) is hitting the other side of the turbine and slowing wind engine rotation and system can still achieve desirable rotation effect. The matrix structure of rotating elements allows reduction of their size and cost, so that manufacturing and maintenance of the engine is significantly alleviated. Moreover, this matrix structure allows incremental control of the engine torque for given flow speed, so that automatic stabilization of the total engine power becomes possible. Selective release of some flap elements of the matrix (e.g. row by row) allowing them to move freely during both portions of work cycle is equivalent to the reduction of the panel size with the corresponding reduction of the engine power. This provides the adaptation means for the wide range of wind speeds from light breeze up to the gale force.

It was empirically found that optimal number of sail panels is within the range from 2 to 6. Larger numbers of sail panels increases the system mass without significant increase of driving torque, so the overall efficiency falls down. Optimal size of elementary flap is in the range from 0.5×0.5 meter to 3×3 meters. The number of flaps within the sail matrix is not so critical; it may vary in the range from 3×3 to 30×30.

Naturally, the same hardware can be used as a more efficient ventilator device. If the device is forced to rotate, e.g. by electric motor, it produces quite uniform air flow. Moreover, instead of the air flow it could be the flow of any other substance, including all sorts of gases or liquids. Similarly, the device could be driven by fluid movement other than wind.

BRIEF DESCRIPTION OF THE DRAWINGS

Embodiments of the invention described herein will become apparent from the following detailed description considered in connection with the accompanying drawings, which disclose several embodiments of the invention. It should be understood, however, that the drawings are designed for the purpose of illustration and not as limits of the invention.

FIG. 1A shows a top view of a multi-matrix turbine in one embodiment of a multi-matrix Vertical Axis Wind Turbine.

FIG. 1B shows a side view of multi-flap matrix sail in one embodiment of a multi-matrix Vertical Axis Wind Turbine.

FIG. 2A shows the system work cycle phases when the flap is closed with the wind behind the sail, maximal sail torque.

FIG. 2B shows the system work cycle phases when the flap is open with the wind in front of sail and nearly zero sail torque.

FIG. 3 shows an example of the wind turbine onshore installation.

FIGS. 4A-4B show a top view and a side view of an exemplary offshore Installation with floating turbine attached to the static platform (e.g. oil-rig.

FIG. 5 shows an example of offshore installation with several floating turbines attached to the oil-rig.

FIG. 7A shows a side view of the wind turbine installed on platform extension.

FIG. 7B shows an overall top view of the installation of FIG. 7A.

DETAILED DESCRIPTION

Figures 6A, 6B:
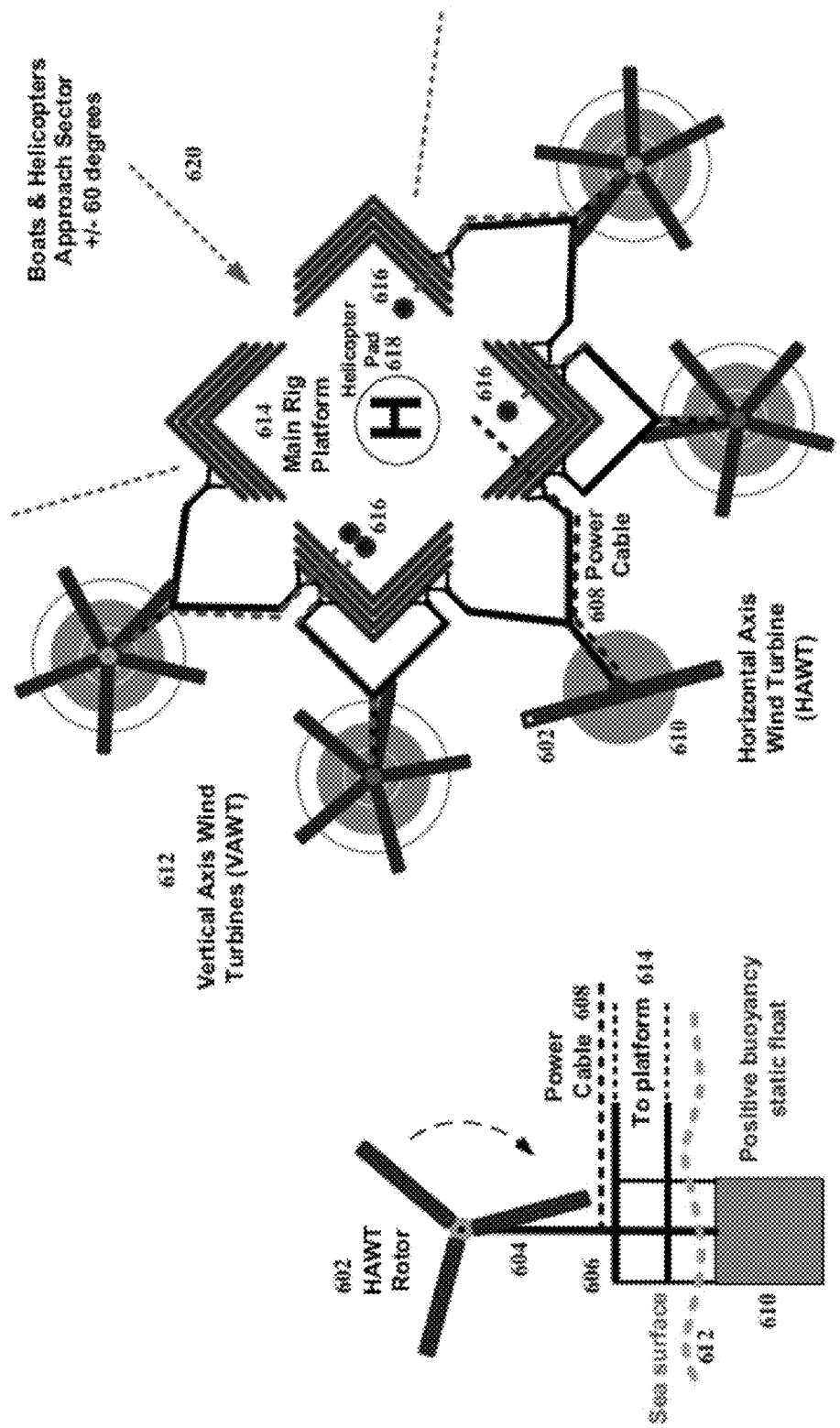
FIG. 6A shows exemplary sides view of a hybrid VAWT/HAWT offshore Installation installed on a floating suspension.
FIG. 6B shows an overall top view of the hybrid VAWT/HAWT installation of FIG. 6A.

Embodiments of offshore wind turbines disclosed herein preferably comprise vertical-axis wind turbines (VAWTs) mounted on platforms. The VAWTs can be Darrieus-type with or without guy cables and can be mounted on floating or fixed platforms. The VAWT has a vertical rotor with curved or straight blades coupled to a gearbox and an electric generator. Alternatively, the VAWT can have a direct-drive generator without the gearbox. The vertical rotor can fixedly extend from the floating or non-floating platform or may be tilted down to rest on the platform either manually or automatically. The platform is preferably buoyant so it can be floated to a desired destination offshore and towed back to the service beach for repairs and maintenance.

For deeper water, the platform can be a semi-submersible barge with the VAWT extending out of the water and with a counterbalance extending below the platform to counterbalance the wind force against the wind turbine. For shallower water that will not accommodate the vertical extent of a counter balance, the platform can float on the water's surface like a barge. Preferably, the barge is heavy and constructed with low-cost reinforced concrete. To minimize the use of materials, the barge is preferably not rectangular or circular shape and instead has a cross-shape or star-shape with three or more arms. For example, the barge is preferably constructed with extended horizontal reaches to fasten guy cables, to counter-balance the wind force against the wind turbine, and to keep the platform stable. In addition, to extend its horizontal reaches, each of its arms can have a horizontal extender with a flotation tank at its end to increase stability.

For even shallower waters near shore, the VAWT on a floating platform can be built with heavy but low-cost materials, such as reinforced concrete, and can be built and assembled on the beach, pushed into the sea, and towed to the site. By filling its flotation tanks with water, the floating platform can be lowered into the water to rest directly onto the seabed, lake bed, or river bed. In this way, the platform can serve as a fixed platform or foundation for the VAWT during normal operation, while the vertical rotor and blades of the VAWT extend above the water's surface. The platform can be re-floated by pumping the water out of the flotation tanks so the VAWT and platform can be towed back to the beach for repairs and maintenance. The ability to refloat the platform and tow it for repairs can greatly reduce the cost of assembly, installation, repairs, and maintenance when compared to performing these activities at sea.

Various anchoring systems can be used for anchoring the platforms intended to float on or near the water's surface, including the catenary anchoring system and the tension-leg anchoring system that are often used in the offshore industry for anchoring oil and gas drilling and production floating platforms. Some of these anchoring systems can have weights and pulleys that anchor the platform to the seabed but allow the floating wind turbine to adjust passively to changes in sea level due to tidal variations or storm swells. In some embodiments, the anchoring systems do not rigidly affix the platforms to the seabed, but instead merely rest on the seabed, which eases installation and removal of the VAWTs.

FIGS. 1A-1B show various views of the preferred embodiment of multi-matrix Vertical Axis Wind Turbine including a) a top view of multi-matrix turbine, and b) a side view of multi-flap matrix sail. Referring initially to FIG. 1A, a wind flow 102 hits the wind turbine consisting of a number of sail panels 104 rotating around the vertical axis (axial column) 106. At any given time moment some of the said sail panels 104 are active, e.g. panels 108 (flaps closed) provide significant rotating torque, while some other panels, e.g. panels 110 are idle because their flaps are open and the wind flow comes thru these panels without any significant resistance. Flaps change their status at the moment when the sail panel and all its flap axes are positioned along the flow. This is designated on FIG. 1a as "flaps switching point" 112.

As shown in FIG. 1B, each sail panel consists of a metal frame 114 carrying a number of flaps 118 (elementary flap panels) rotating on elementary axes 118. Size of the openings in the panel grid 114 allows flaps 118 to rotate freely without any constraint. Sail panel frame 114 is also fitted with the relatively long (in the direction parallel to the elementary axes 118) stoppers 120, which can be shifted in the vertical direction to the upper (work) position or lower (idle) position. Stoppers 120 are offset from the centers of the flaps 118 so that each of the flaps can rotate free until its wider side touches the corresponding stopper (if the stopper is in the upper position).

Shifting down said stopper controls 122 allows full release of flaps, thus completely inactivating the particular row of sail panel matrix. This provides the adaptation means for the wide range of wind speeds from light breeze up to the gale force.

One embodiment of the system is used offshore. Although usable in various depths of water, this offshore wind turbine is suitable for use in deeper waters offshore having depths greater than 30 meters, for example. In this embodiment, the turbine's platform can be anchored to a drilling platform using any number of available anchoring systems known in the art. In other embodiments, the system can be attached to the seabed using various anchoring systems. For example, the anchoring system can be a catenary anchoring system or a tension-leg anchoring system that is used for the floating platforms for offshore oil and gas drilling and production. The floating platform can be anchored at three or more points to the seabed at three or points to prevent it from rotating. The offshore wind turbine with the sail matrix does not suffer from some of the problems associated with offshore HAWTs known in the art.

As discussed previously, offshore HAWTs must be oriented relative to wind direction and must be rigidly constructed and stabilized to support the rotor, blades, and tower above the water level. By contrast, the sails of the VAWT of FIG. 1A do not need to be oriented toward the wind's direction, and the VAWT's rotor and blades can be constructed mainly of composites or other lightweight, corrosion-resistant materials. In addition, the rotor and blades can be built with a low profile over the water so that the offshore wind turbine can have a lower center of gravity—unlike offshore HAWTs that must support the heavy rotor, blades, gearbox, generator, and tower high above the water. At the height of 50 meters, for example, the wind over the sea may be significantly greater than the wind over land, so the VAWT 50 on the offshore wind turbine 100 can have greater energy output than its land-based counterparts.

In summary, the offshore wind turbine's low center-of-gravity, omni-directional, and lightweight construction make it easier to stabilize and support in the water with a low-cost floating platform.

FIG. 2 illustrates the work cycle of one flap of the panel. At the position shown on FIG. 2A the flap 204 orientation is approximately perpendicular to the wind direction 202, i.e. flap is facing the wind; its anticlockwise movement is restricted by stopper 216.

Aerodynamically shaped flap 204 can rotate around the axis 206; latch 208 keeps it in place. Flap 204 is designed to have such non-uniform mass distribution, so its center of gravity 210 is approximately co-sited with the position of axis 206. However, the center of wind pressure 212 is approximately in the middle of flap surface. This offset provides for significant flap closing torque 214, pushing the flap edge towards stopper 216.

Hence the air flow pressure applies mainly on the axis 206 and to a certain extent on stopper 216, thus forcing the whole wind turbine to rotate. Pressure on stopper 216 is proportional to the torque 214, which in turn is inversely proportional to the offset between center of pressure 212 and center of gravity 210. This pressure can be adjusted to relatively low values by appropriate re-distribution of flap mass, i.e. by adjustment of its thickness profile.

In case of extremely strong wind this design may also work as a "safety valve". Central part of the flap 204 bends rightwards due to the wind pressure and flap edge pushes the stopper 216 down, completely inactivating the whole row of the matrix (non-driving mode).

Normal rotation of the wind turbine results in the sail panel moving into the position where the relative wind direction is opposite as shown on FIG. 2b. During this interval the flap 204 does not contact the restricting stopper 206 and stays loose along the wind direction, hence it will apply practically no pressure on the axis 206. Open flap is stabilized in this position by very small torque 216 produced by the wind pressure in case of small flap tilt variations.

If the sail panel reaches the "flap switching point" 112, i.e. the intermediate position where wind direction is along the axis 206, then the flap 204 switches quickly between the modes shown on FIG. 2A and FIG. 2B. This intermediate position is fundamentally unstable, so the flap alignment switches relatively quickly. In such case the flap 204 contacts the restricting stopper 206 again, which is the beginning of the next cycle.

It should be noted that the flap status change happens quickly, quietly and smoothly because at this moment the wind pressure on the flap surface is about zero, so there is no significant loads on any component.

It is possible to install the wind turbine on water as well as on solid ground. FIG. 3 shows an example of wind turbine onshore installation. In the preferred embodiment the wind turbine is installed above static concrete shell 302, which includes liquid-filled basin, e.g. a cavity filled with water. The shell 302 holds a static metal frame 304, which in turn holds rotating axial column 306. Two heavy-duty conical bearings 308 prevent any horizontal or vertical displacement of the said column. Several matrix sail panels 310 are attached to the axial column 306 with equal angle intervals, so the whole star-shaped turbine assembly is balanced.

Bottom part of the frame 304 contains electric power generator 312, which may include optional gear box or hydraulic transmission purposed to convert high torque slow speed rotation of the axial column to low torque high speed rotation more suitable for electric power generation.

Power cable 314 serves to connect the generator 312 to the local power distribution grid or similar system.

Width, height and weight of the installation are relatively high. Rotating flywheel float 316 is important component of the system allowing handling of such system in cost-efficient way. It provides necessary inertia and lifting force (support), reducing rotation non-uniformity and downward pressure, thus reducing load on bearings and other mechanical elements. For example, the float 316 can be build from polystyrene bead concrete (concrete foam) having significant positive buoyancy.

If the float 316 lifting force is nearly equal to the total weight of frame 304 (i.e. slightly lower than total weight of all its components), then the load on conical bearing constitutes only small fraction of the total weight.

Liquid, surrounding the float 316, offer very low resistance to the flywheel movement because of the slow rotation speed of about a few turns per minute.

The surface of the shell 302 is in level with the ground surface 318, which also helps to bring down overall construction and maintenance cost.

FIGS. 4A-4B show an example of offshore Installation with floating wind turbines attached to a static platform (e.g. oil-rig). As shown on FIG. 4A matrix sails 402 installed on static shell float 404 are linked together by metal ring 406. The sails assembly rotates slowly being driven by wind flow 408. Float 404 is attached to the edge of main platform 408 via metal frame 410 and parallelogram suspension 412 fitted with four joint-hinges.

As seen on FIG. 4B one vertical column of the suspension 412 (left on the drawing) is fixed to the platform edge 408, while another one can move up and down, thus compensating for tidal and other long waves present on the sea surface.

Rotation of matrix sails 402 drives reversible hydraulic pump/motor installed on top of the metal frame 410. The hydraulic transmission also includes flexible hydraulic hose 416 and the combination 418 of hydraulic motor with electric power generator. This motor-generator is installed on the main platform 408.

FIG. 4B shows the parallelogram suspension 412 attached to top deck 420 and bottom deck 422 of the main platform. Metal frame 410 can move up and in down to follow current level of sea surface 430. The said frame holds rotating axial column 424 with conical bearings 426.

Bottom part of the frame 410 is connected to non-rotating shell float 404 made from positive buoyancy material, e.g. from concrete foam. Inside the float 404 is a water-filled cavity providing enough room to accommodate flywheel float 428 fixed at the bottom of axial column 424.

Together float 404 and rotating float 428 provide lifting force slightly smaller than the total weight of metal frame 419 with all its components. This significantly reduces the load on bearings 426 and suspension 412.

To provide additional protection in case of extremely bad weather the "safe heaven" for the floating wind turbine assembly can be sought in the deeper water. In case of approaching hurricane or tsunami wave the whole assembly can be detached from the main platform, by disconnecting the joints of the parallelogram suspension 412, and lowered down controllably underwater by a conventional winch. After the hurricane is over the assembly can be winched back in it's working position and re-attached.

FIG. 5 shows an example of offshore installation with several floating wind turbines 502 attached to the oil-rig platform 504. Via hydraulic transmissions mechanical power is delivered to several motor-generators 506 installed on the platform.

In some cases main platform 504 has a helicopter pad 508 and naval aviation regulations require helicopter approach sector to be free of any obstacles within +/−60 degrees for at least one mile distance. FIG. 5 shows how asymmetric attachment of the wind turbines 502 allows meeting these requirements.

FIG. 6 shows an example of hybrid VAWT/HAWT offshore Installation. FIG. 6a shows conventional Horizontal Axis Wind Turbine installed on the floating suspension. The turbine rotor 602 rotates on top of the tower 604 held by metal frame 606 attached to the platform 614 via parallelogram suspension, described above.

A float 610, positioned under the sea surface 612, provides lifting force reducing the load on suspension and the platform. Electric power generated by the turbine 602 is transmitted to platform 614 via flexible cable 608.

Other components of the hybrid installation are shown on FIG. 6b. They are similar to those of FIG. 5 and include several vertical axis wind turbines 612, connected to main platform 614 and motor-generators 616. This installation also provides for helicopter pad 618 and corresponding approach sector 620.

FIGS. 7A-7B show a variant of oil-rig installation with all components above the sea level. This variant is safer in case of strong sea winds or waves. FIG. 7A shows a side view of the wind turbine installed on platform extension, while FIG. 7B shows an overall top view of the installation of FIG. 7A. To accommodate large enough sail panels the metal frame 702 and axial column 704 are installed on special platform extensions 706 welded to main platform edges. In this variant a smaller and lighter flywheel 708 of non-floating type is fixed on the bottom end of the axial column 704—underneath the platform extension 706, but above the sea surface 10.

Otherwise this variant is similar to those of FIG. 5 and FIG. 6. It includes several wind turbines assemblies 712 installed on the extensions 706 of main platform 714.

In one implementation, a large number of the disclosed wind turbines may be used in a wind farm matrix at an offshore location.

The wind turbines can be anchored near one another and interconnected together by common electrical cables. In the matrix, power lines connect the wind turbines to power barges. In turn, these power barges can connect to one another by power cables. The power barges receive power (i.e., current) from at least some of the floating wind turbines to which they are connected, and communicate such power to a land-based station or other power sink by one or more commonly shared cables.

To install the matrix offshore, each offshore wind turbine can be assembled, towed, and anchored into position using any of the methods known to those skilled in the art, and connected to the power grid to generate electricity.

Similarly, each offshore wind turbine can be easily disconnected from the matrix and towed back to the shore for repairs and maintenance without affecting the entirety of the matrix. In this regard, it can be of substantial benefit to use anchoring systems and methods that do not rigidly affix the offshore wind turbines to the seabed.

The power barges, like the platforms of the floating wind turbines, may float at or near the water's surface, and may be similarly constructed to the platforms of the floating wind turbines. Because the power barges merely act as an electrical hub to which the floating wind turbines can connect and need not carry significant hardware beyond conventional connectors and cabling (unlike the turbines), the barges may not need to be anchored to the seabed with the same degree of diligence as do the turbines.

The barges may lack an anchor, have their own anchors, connect by cables to the anchors of the offshore wind turbines, or use any of the various anchoring systems known to those skilled in the art. The matrix can connect to a nearby offshore platform to communicate power to the platform or some other power sink.

For example, the offshore platform, if involved in oil exploration, may contain a desalination system used for injecting fresh water down a borehole of an offshore platform (not shown). On the platform, the desalination system can use the process of reverse osmosis to produce fresh water from seawater so the freshwater can then be used for filling, fracing, or other platform operations. Because the desalination system can require a great deal of energy to operate, using the wind farm matrix near the desalination system to provide the power can greatly facilitate offshore drilling operations.

The foregoing description of preferred and other embodiments is not intended to limit or restrict the scope or applicability of the inventive concepts conceived of by the Applicants. With the benefit of the present disclosure, it will be appreciated that details described with respect to one embodiment disclosed herein can be combined with or used on other embodiments disclosed herein, even though such combination or use may not be explicitly shown or recited herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An energy conversion system, comprising:
   a support rotatable about a first axis orthogonal to a direction of fluid movement;
   at least one panel mounted on the support for rotation about a said first axis, the panel having a matrix of flaps respectively mounted in openings on the panel for rotation about multiple horizontal secondary axes;
   retaining hardware extending parallel to the secondary axes and across adjacent openings to resist rotation of said flaps during a first portion of a rotation cycle of the support and permitting the flaps to rotate freely during a second portion of said cycle, the panel providing a driving torque during said first portion of the cycle and moving freely to an orientation with minimum fluid resistance during said second portion;
   wherein said retaining hardware comprises an abutment on the support for each rotating flap, and
   wherein the abutment is retractable to place the rotating flaps in a non-driving mode.

2. The system of claim 1, comprising a plurality of said panels to provide driving torque during different portions of the cycle of rotation of the support.

3. The system of claim 2, wherein the panels are distributed circumferentially about said first axis.

4. The system of claim 1, wherein a flow resistance distribution of each rotating flap is eccentric with respect to its axis of rotation.

5. The system of claim 4, wherein a mass distribution or a shape of each rotating flap ensures that a center of mass of the rotating flap lays close to its axis of rotation.

6. The system of claim 1, comprising a plurality of abutments, wherein the abutments are retractable by groups depending on the measured speed of the flow.

7. The system of claim 1, wherein each flap is substantially planar.

8. The system of claim 1, wherein the flaps are aerodynamically shaped.

9. The system of claim 1, comprising a rotating flywheel float coupled to the support to reduce a weight load.

10. The system of claim 9, wherein the flywheel float comprises a static float to reduce the weight load for offshore installation.

11. The system of claim 1, wherein the flaps are installed on or near an offshore platform.

12. The system of claim 1, comprising a parallelogram suspension coupled to the support to compensate for tidal and other long waves; wherein the suspension is decoupleable to lower the support below a surface.

13. The system of claim 1, comprising a hydraulic transmission coupled to the support.

14. The system of claim 1, comprising a plurality of turbines combining their outputs with a hydraulic collector.

15. The system of claim 1, wherein the flaps form a vertical axis wind turbines (VAWT), comprising a Horizontal Axis Wind Turbine (HAWT) to form a Hybrid HAWT/VAWT system to optimize efficiency over a range of wind speeds.

16. The system of claim 1, comprising a platform extension extending to the support away from a small platform to mount a large turbine for the small platform.

17. A method for generating energy, comprising:
providing a support rotatable about a first axis orthogonal to a direction of fluid movement;
mounting at least one panel on the support for rotation about said first axis, the panel having a matrix of flaps respectively mounted in openings on the panel for rotation about multiple horizontal secondary axes;
providing retaining hardware extending parallel to the secondary axes and across adjacent openings to resist rotation of said flaps during a first portion of a rotation cycle of the support and permitting the flaps to rotate freely during a second portion of said cycle, the panel providing a driving torque during said first portion of the cycle and the flaps moving freely to an orientation with minimum fluid resistance during said second portion;
wherein said retaining hardware comprises an abutment on the support for each rotating flap, and
wherein the abutment is retractable to place the rotating flaps in a non-driving mode.

18. The method of claim 17, comprising providing driving torque with a plurality of said panels during different portions of the cycle of rotation of the support.

\* \* \* \* \*